United States Patent [19]
Jones et al.

[11] Patent Number: 4,578,763
[45] Date of Patent: Mar. 25, 1986

[54] SAMPLED DATA SERVO CONTROL SYSTEM WITH DEADBAND COMPENSATION

[75] Inventors: Donald H. Jones, Pittsburgh; Spencer W. Allen, Murrysville; Philip R. Chimes, Pittsburgh, all of Pa.

[73] Assignee: International Cybernetics Corp., Pittsburgh, Pa.

[21] Appl. No.: 523,063

[22] Filed: Aug. 15, 1983

[51] Int. Cl.$^4$ ............................................. G05B 19/25
[52] U.S. Cl. .................................... 364/513; 364/170; 364/178; 318/571; 318/632
[58] Field of Search ............... 364/167, 168, 169, 170, 364/171, 513, 474, 178, 723, 761; 318/571, 573, 603, 632, 636; 901/2, 14, 50

[56] References Cited

U.S. PATENT DOCUMENTS

| | | | |
|---|---|---|---|
| 4,041,287 | 8/1977 | Kolell et al. | 364/169 X |
| 4,060,851 | 11/1977 | Nakatsukasa et al. | 364/167 X |
| 4,061,953 | 12/1977 | Matsumoto | 318/573 |
| 4,213,186 | 7/1980 | Murata et al. | 364/723 |
| 4,243,924 | 1/1981 | Onoda et al. | 364/723 X |
| 4,250,551 | 2/1981 | Paveglio, Jr. et al. | 364/474 |
| 4,445,182 | 4/1984 | Morita et al. | 364/170 X |
| 4,453,221 | 6/1984 | Davis et al. | 364/174 X |
| 4,493,032 | 1/1985 | Johnson | 364/169 |

*Primary Examiner*—Jerry Smith
*Assistant Examiner*—Allen MacDonald
*Attorney, Agent, or Firm*—Robert D. Yeager

[57] ABSTRACT

The present invention provides a high response inexpensive microprocessor based control system. The system uses only one detector that detects only one motion characteristic of the object controlled by the system. In the preferred embodiment, the system controls the position and velocity of the movable member of the motor by creating commands that represent the desired position of the movable member 1024 times per second. The system also provides methods for improving the accuracy and precision of the system.

21 Claims, 8 Drawing Figures

$$\frac{\text{Position Error}}{K_A} \text{ Is Small}$$

$$\frac{\text{Position Error}}{K_A} \text{ Is Large}$$

SAMPLED DATA SERVO CONTROL SYSTEM WITH DEADBAND COMPENSATION

BACKGROUND OF THE INVENTION

1. Field of the Invention

The present invention relates to motion control systems and, more particularly, to a servo control system operating in a sampled data mode.

2. Description of the Prior Art

Designers of servo motion control systems have attempted to take advantage of advances in computer technology by designing servo control systems which respond more quickly to motion command signals or which more precisely control the movement of the object under control. For example, the working members of industrial robots must be capable of quick precise movement and, therefore, high response servo control systems are highly desirable to control those members.

A computer with a large memory capability and great computational power—referred to commonly as a main frame computer—or a large minicomputer is often used to implement a control system where great computational power is required. However, main frame computers and large minicomputers have not been used to implement high response industrial servo control systems because their expense is prohibitively great.

Microprocessors are much less expensive than main frame computers or large minicomputers. Therefore, workers have designed servo control systems which are implemented by microprocessors. However, their use in digital servo control systems has created several other problems. In particular, the calculation speed of a microprocessor is not relatively high and, therefore, the response time of a control system using a microprocessor cannot be as high as is desirable. Further, a microprocessor performs calculations in integer fashion, which causes errors when the results of the calculations are rounded. Therefore, the system cannot control the motion of the controlled object with sufficient accuracy.

Many conventional servo systems use a microprocessor only to process motion commands. The servo loop is controlled by either conventional analog or high speed digital techniques. Those systems do not use fully the capabilities of existing microprocessors. Accordingly, workers have designed digital servo systems which are implemented totally by microprocessors. Many of those conventional systems are of a form depicted generally in FIG. 4. To implement a system of the type shown in FIG. 4, the computer receives the motion commands and a set of signals representing the actual motion of the object under control and calculates deviations of the motion of the controlled object from the motion represented by the motion commands. Blocks A and B of FIG. 4 represent compensating gain lag/lead networks usually included in analog control systems and consist of any or a combination of gain or time dependent following processes, which affect the manner in which the control system follows the motion commands.

Two problems are encountered through use of microprocessors to implement digital servo systems, both of which result from the manner in which the microprocessor performs calculations. Because the microprocessor consumes a relatively large amount of time to perform calculations, the bandwidth of any system implemented by a microprocessor is relatively low. Further, because the microprocessor performs calculations using integer arithmetic, the results of the calculations are rounded, which causes the calculations, and thus the motion of the controlled object, to be relatively inaccurate. Any attempt to increase the accuracy of the system by performing the calculations in floating point arithmetic would further lower the bandwidth of the system, due to the increase in time necessary to perform floating point calculations.

Performance of calculations in integer arithmetic also limits the precision of the system. The cycle rate of the microprocessor is generally defined as the number of times per second that the microprocessor accepts motion command information and generates commands. The cycle rate is set at a constant rate which is a function of the maximum required bandwidth of the system, the computation time of the microprocessor and other parameters of the system. To provide a servo control system with a sufficiently wide bandwidth, a cycle rate on the order of one millisecond is required. Such a system permits only integer velocity commands in steps of only one thousand increments per second. For many systems, including systems which control robots, the system must be able to accurately produce more precise motion.

Moreover, many conventional microprocessor based positioning systems define one revolution of the controlled rotating member as a number of increments that is convenient for the microprocessor system to process, such as 1024 increments. However, the user of the system may find it inconvenient or unnecessary to use such a number of increments.

Accordingly, there exists a need for a high response inexpensive accurate and precise microprocessor implemented servo control system.

SUMMARY OF THE INVENTION

The present invention provides a sampled data system for controlling the motion of an object. The system includes a command processor which processes a command representative of the desired motion of the object by generating at least one series of subcommands. Each subcommand represents a segment of the desired motion over a time interval. The system also includes a subcommand comparator for comparing the subcommands to at least one signal representative of the actual motion of the object and generating at least one error signal representative of the variation of the characteristic of the actual motion of the object from the corresponding characteristic of the motion represented by the subcommands. The system includes a motion detector for detecting a single motion characteristic of the actual motion of the object and generating all the actual motion signals therefrom. The system includes a modifier for so modifying the error signals that the system exhibits a set of desired performance characteristics. The system also includes a converter for converting at least one modified error signal to a signal suitable for application to a prime mover which causes the object of exhibit the desired motion.

In a preferred system of the present invention, the motion represented cumulatively by a group of subcommands generated over a time interval is the desired motion of the object over that interval. Also preferably, the system includes means for permitting a user of the sampled data system to formulate motion commands in external units, which differ from the internal units used by the system to process motion commands, and converting the external motion commands to internal motion subcommands, with no loss in accuracy of the system.

The preferred system embodying the present invention assigns a value to each subcommand that is related to the desired position of the object at some time. The position of the object and the velocity at which the object moves is controlled by assigning appropriate values to the subcommands. In the preferred embodiment, the processor creates a series of position command signals, the value of each of which represents the position which the object is to assume. Preferably, the processor generates each subcommand within a time interval or cycle, of a predetermined length, all the cycles being of the same duration. The processor creates a position command during a cycle by calculating an incremental position signal, which represents the number of increments the movable member must move during the cycle, and adding the incremental position signal to the preceding position command. The total number of position increments represented by the incremental position signals from which the subcommands are created divided by the length of the period of time spanned by the subcommands is equal to the desired velocity of the object over the period.

Each incremental position signal and each subcommand is represented by an integer; the values of the incremental position signal integers over the time period are so determined that the sum of the incremental position signals divided by the length of the time period is substantially equal to the desired velocity of the object during the time period. The variation between the largest incremental position signal in the period and the smallest signal is no larger than one.

Preferably, the single motion characteristic detected by the detector is the position of the object. Accordingly, the detector can be a position sensor, the output of which is a series of actual position signals, each of which represents the actual position of the object at the time the position signal is generated.

The detector can so process the series of actual position signals that the comparator can compare the series of actual position signals to the series of subcommands to produce a series of position error signals representing the difference therebetween. The system can generate from the series of actual position signals a series of signals related to the actual velocity of the object and the comparator can compare a series of modified position error signals, or velocity commands, generated by the modifier to the series of actual velocity signals to produce a series of velocity error signals related to the difference therebetween. The modifier can modify the velocity error signals and the converter can convert the modified velocity error signals to signals suitable for application to the prime mover.

Preferably, the modifier includes an attenuator for reducing the effect that each position error signal has on the magnitude of the velocity at which the object is moved to a desired position, to decrease the acceleration the object experiences as it moves toward the desired position. The attenuator can operate to divide each position error signal by a predetermined number. Preferably, the division is performed in integer fashion and the attenuator so increases the values of some of the position error signals that the average value of the divided position error signals approximates the value each divided position error signal would have had if the division had been performed by some more precise calculating technique, such as floating point arithmetic.

Preferably, the value of each actual position signal indicates at which position of a set of positions the object is located, and the system is capable of causing the object to assume any position in the set of positions. The system can include a convertor for permitting a user of the sampled data system to specify motion data in external units, with no loss in system accuracy. The set of external units is less in number than the number of internal units, which is the set of positions used by the system and which the controlled member can assume. Accordingly, the processor receives commands in external units and calculates the corresponding internal units. The command processor receives the incremental position signals in external units and converts them to internal units and creates from them the series of position subcommands in internal units.

BRIEF DESCRIPTION OF THE DRAWINGS

The following detailed description of the preferred embodiments can be understood better if reference is made to the drawings, in which.

DETAILED DESCRIPTION OF THE PREFERRED EMBODIMENTS

Figure 1:
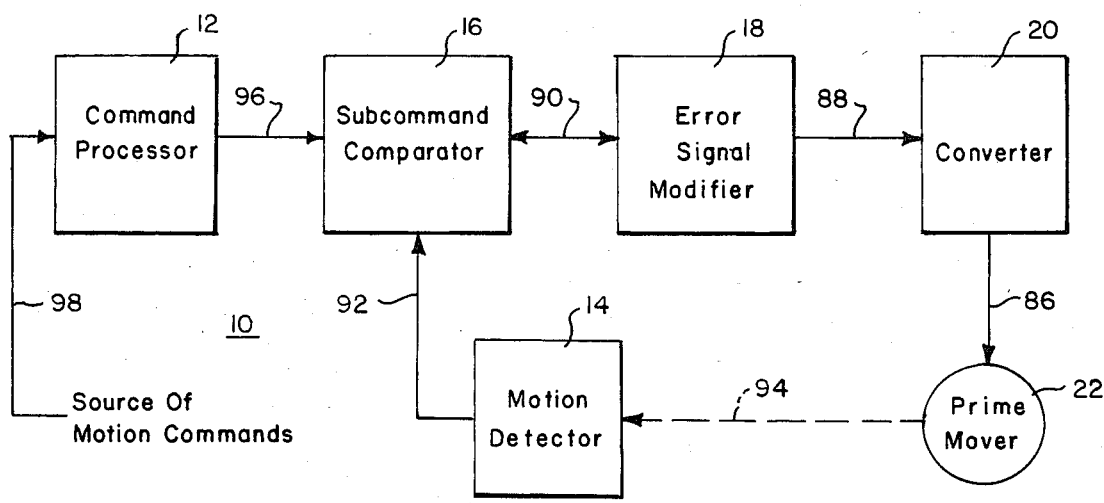
FIG. 1 is a block diagram representation of a servo control system embodying the present invention.

FIG. 1 depicts broadly, in block diagram form, a servo control system 10 that is an embodiment of the present invention. System 10 can be implemented by a microprocessor which receives and analyzes motion information and generates motion commands with a desired constant frequency, generally defined as cycles per second. The frequency with which the microprocessor produces motion commands depends on the characteristics of the microprocessor implementing the system and the operating characteristics desired of the control system 10.

System 10 includes a command processor 12 which receives motion commands along line 98 from a suitable source of motion commands and generates along line 96 a series of motion subcommands. Each subcommand represents the motion that the movable member of the prime mover must assume over the cycle corresponding to the subcommand. Motion detector 14 receives information along line 94 pertaining to a single motion characteristic of the movable member of the prime mover 22. During each cycle, motion detector 14 generates along line 92 information pertaining to a single motion characteristic of the movable member of prime mover 22. Subcommand comparator 16 receives along line 96 the series of subcommands generated by command comparator 12 and receives along line 92 the series of motion characteristic signals produced by motion detector 14. During each cycle, subcommand comparator 16 calculates any motion information it needs and compares the commanded and actual motion and generates an error signal along line 90 relating to the difference between the commanded and actual motion.

Error signal modifier 18 receives motion error signals from subcommand comparator 16 along line 90 and modifies the series of error signals to achieve a set of desired system characteristics. Depending on the exact configuration of system 10, error signal modifier 18 may pass modified error signals back to subcommand comparator 16 along line 90 to enable subcommand comparator 16 to compare the modified error signals with signals calculated by comparator 16 relating to motion characteristics not measured directly by detector 14. In that case, further error signals are passed along line 90 to error signal modifier 18. In any case, error signal modifier 18 transmits modified error signals along line 88 to convertor 20. Convertor 20 converts the modified error signals it receives along line 88 to signals suitable for application to prime mover 22 which causes the controlled object to exhibit motion represented by the signals on line 98.

Figure 2:
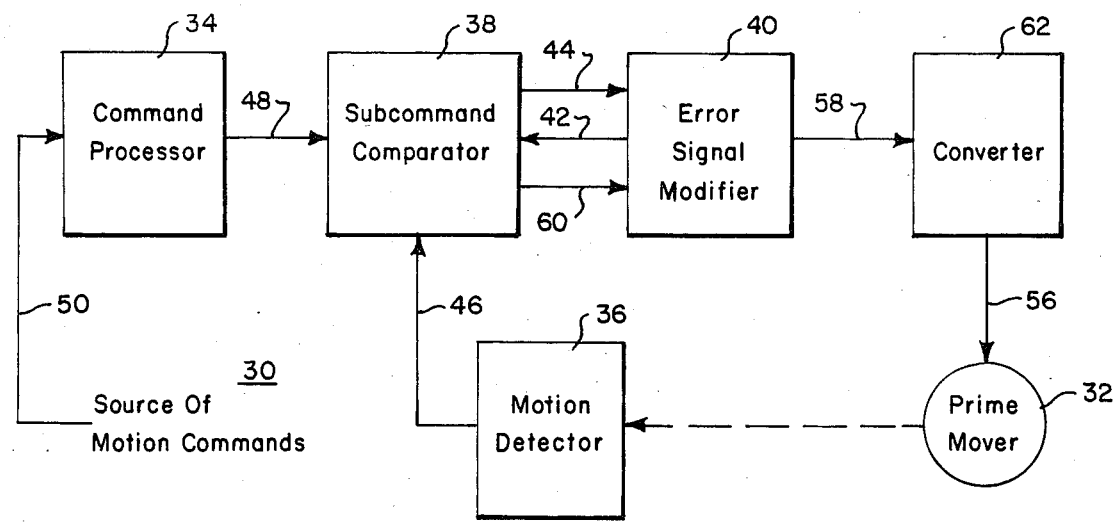
FIG. 2 is a block diagram representation of another servo control system embodying the present invention.

FIG. 2 shows a servo control system 30 that controls the motion of an object by generating a series of subcommands that are related to the desired position of the movable member of prime mover 32. System 30 controls the position of the movable member of prime mover 32 and the speed with which the movable member moves. Command processor 34 receives information along line 50 that represents the desired position and velocity of the movable member. Command processor 34 generates along line 48 a series of subcommands, each of which is related to the desired position of the movable member. Command processor 34 generates only one subcommand during each cycle. The position and velocity of the movable member are controlled by assigning appropriate values to each subcommand. The difference between the values assigned to successive subcommands divided by the cycle time of the microprocessor is the commanded velocity of the movable member during the cycle.

The difference between the number of positions assigned to the first and last subcommands of a series of subcommands divided by the total time represented by the series of subcommands represents the commanded velocity over the period of time spanned by that series.

Motion detector 36 generates an actual position signal along line 46 during each cycle. The value assigned to each actual position signal corresponds to the position of the movable member relative to a reference. Subcommand comparator 38 receives the series of position subcommands along line 48 and the series of actual position signals along line 46. Subcommand comparator 38 receives a position subcommand and an actual position signal during each cycle and generates along line 44 the position error signal representing the difference between those two signals. Error signal modifier 40 receives the series of position error signals along line 44 and performs an operation on that series that controls the acceleration of the movable member as it moves from one position to another. The modified position error, or velocity command, signals are transmitted along line 42 to subcommand comparator 38. The velocity command represents the velocity at which the movable member is required to move during a cycle. Subcommand comparator 38 calculates the actual velocity from the actual position signals received along line 46. The actual velocity signals are subtracted from the velocity command signals by the subcommand comparator 38 and a velocity error signal is generated along line 60. Error signal modifier 40 receives the velocity error signals along line 60 and modifies those signals in any suitable fashion to provide compensating gain for the system. Error signal modifier 40 generates along line 58 the modified velocity error signals. Convertor 62 converts velocity error signals received along line 58 to signals suitable for application to prime mover 32 and transmits those converted signals to prime mover 32 along line 56.

Figure 3:
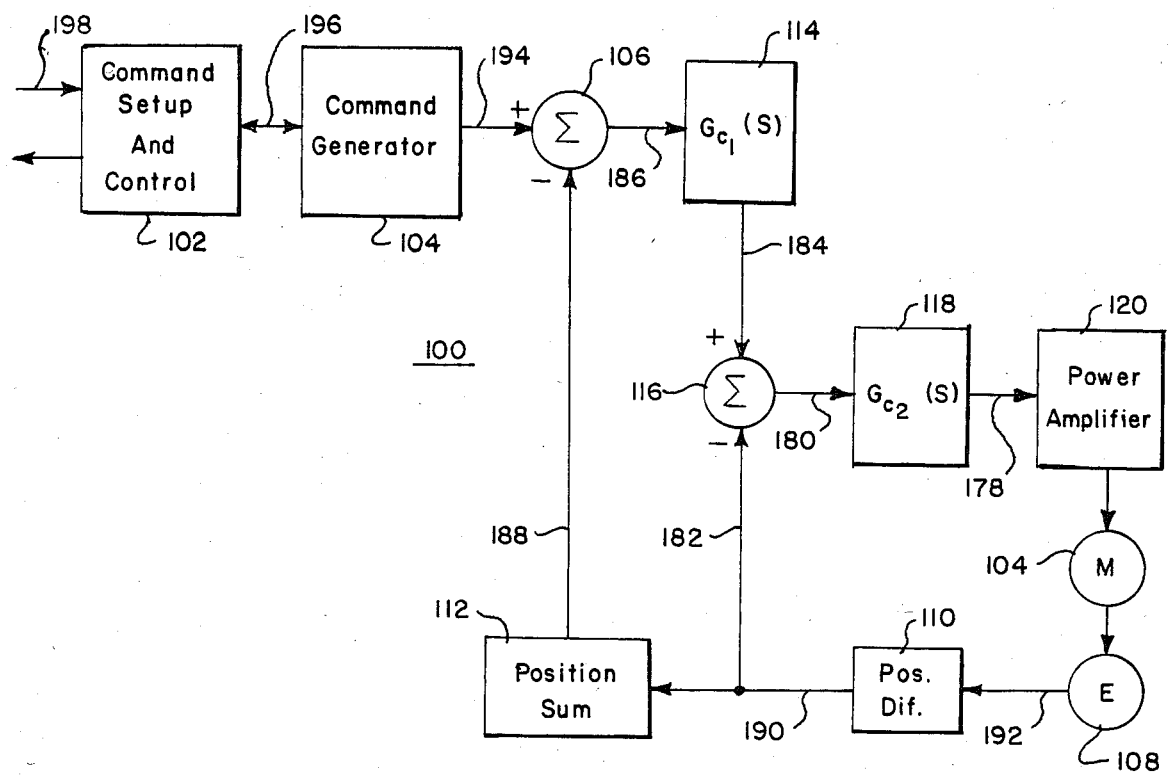
FIG. 3 is a block diagram representation of the preferred embodiment of the present invention.
Figure 4:
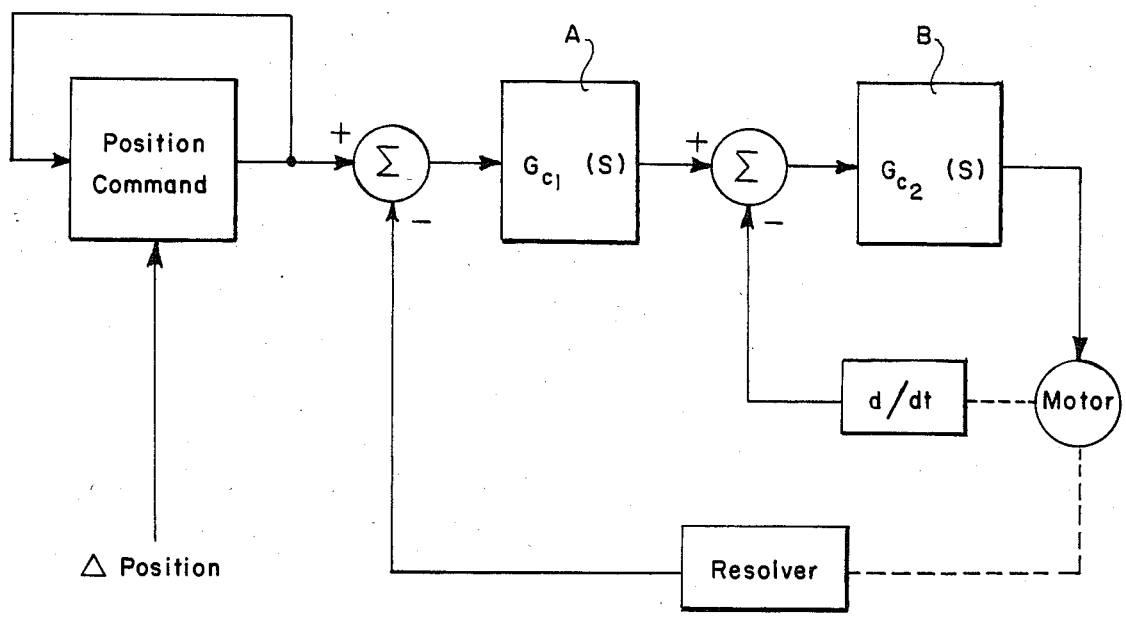
FIG. 4 is a block diagram representation of a conventional microprocessor based servo control system.

FIG. 3 shows servo control system 100, the preferred embodiment of the present invention. Command set up and control module 102 receives signals along line 198 pertaining to the desired position and velocity of the movable member of motor 104. The movable member of motor 104 is adapted for rotation and can assume any one of 16,384 positions or increments. Set up and control module 102 interprets motion commands and sets up the required parameters for command generator 104 and the remainder of system 100. That information is passed to the command generator 104, along with position and velocity information, along line 196. The value assigned to each subcommand represents the position which is to be assumed by the movable of motor 104. Accordingly, a command to move to a given position at a given velocity (and accordingly, within a given time period) is implemented by assigning appropriate values to the position subcommands. Command generator 104 creates a position command during a cycle by adding an incremental position signal of an appropriate value to the position command created during the immediately preceding cycle.

Preferably, the cycle frequency of the microprocessor is 1024 cycles per second. Accordingly, the duration of one cycle is 1/1024 seconds, or approximately 0.98 milliseconds. Because each subcommand spans approximately 0.98 milliseconds, the desired velocity of the movable member can be commanded in increments of only 1024 positions per second. Accordingly, command generator 104 varies the values assigned to each subcommand over a time period to permit more precise specification of the velocity of the movable member. In particular, the values of the subcommands over that period are varied between two numbers, n and n+1, to achieve an average value of X for each subcommand over the period, which is between n and n+1. Therefore, the commanded velocity over the period is 1024 (X) increments per second. Since X can be a fraction, rather than simple an integer, more precise control of the velocity of the movable member can be achieved.

Figure 5:
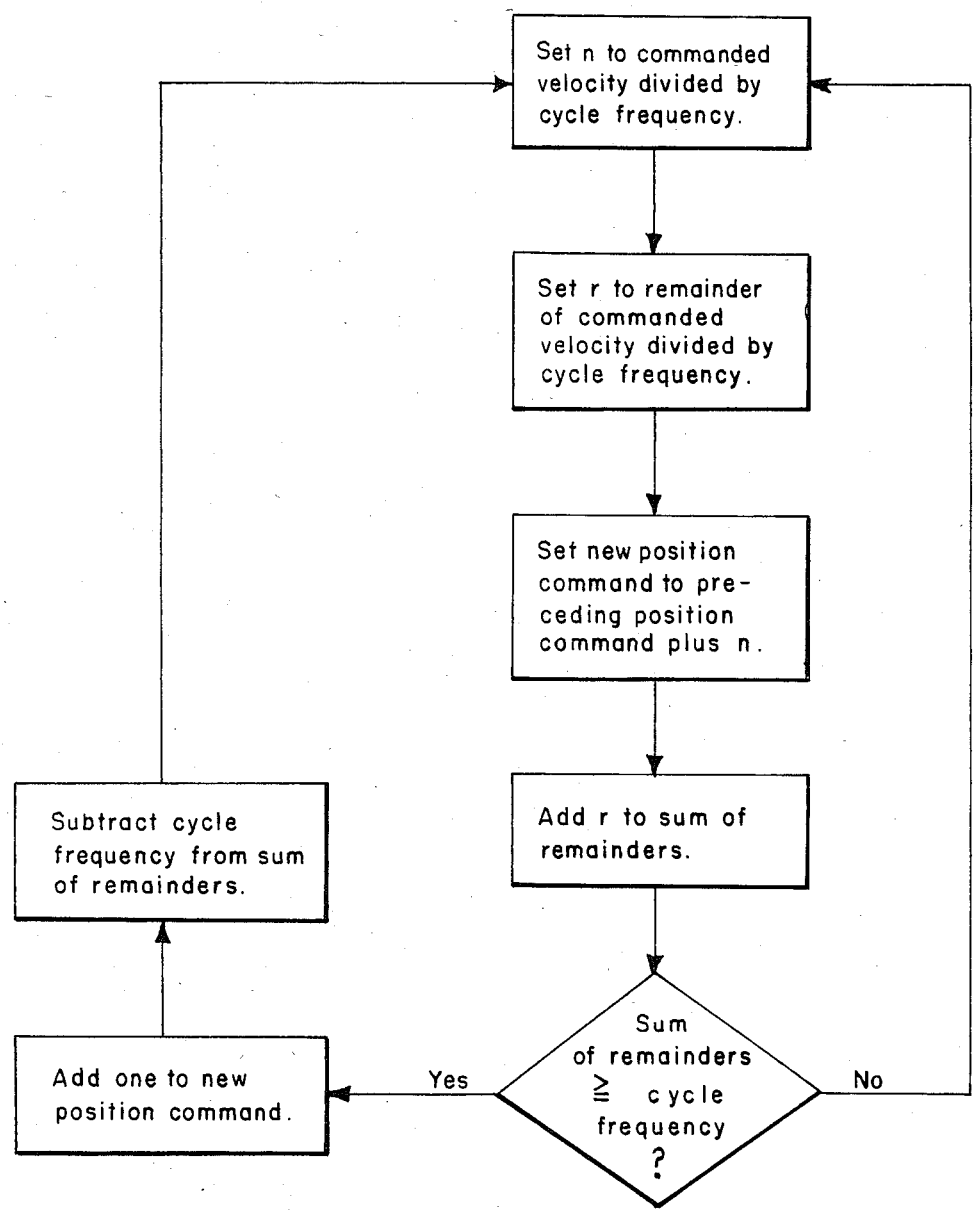
FIG. 5 is a flowchart showing the manner in which the system depicted in FIG. 3 generates incremental position signals.

FIG. 5 shows in flowchart form the method used to assign values to the incremental position signals to achieve precise position commands and velocity control. Generally, command generator 104 accepts from set up module 102 the commanded velocity in increments per second and divides it by the microprocessor cycle frequency, which is 1024 cycles per second. That calculation is carried out in integer fashion within the microprocessor; however, the remainder of the division is saved. The integer portion of the division represents the incremental position signal which will be added to the position command calculated during the preceding cycle, while the remainder represents the error that would result from assigning only the integer portion to each subcommand during the interval. Each time the integer is added to the position command to achieve the position command for the next cycle, the remainder value is added to a running sum. When that sum exceeds 1024, the integer value plus one, rather than simply the integer value, is added to the previous subcommand, and 1024 is subtracted from the running sum.

Command generator 104 transmits the series of modulated position subcommands along line 194 to a summer 106. A digital encoder 108 detects the position of the movable member of motor 104 and transmits along line 192 a signal related to the actual position of the movable member. Module 110 receives the actual position signal along line 192 and generates along line 190 during each cycle a signal that represents the difference between the position of the movable member during that cycle and the position of the movable member during the immediately preceding cycle. Module 112 receives the position difference signal along line 190 and generates along line 188 the sum of the signals it receives. Accordingly, during each cycle, module 112 transmits along line 188 a signal representing the actual position of the movable member.

Figure 6:
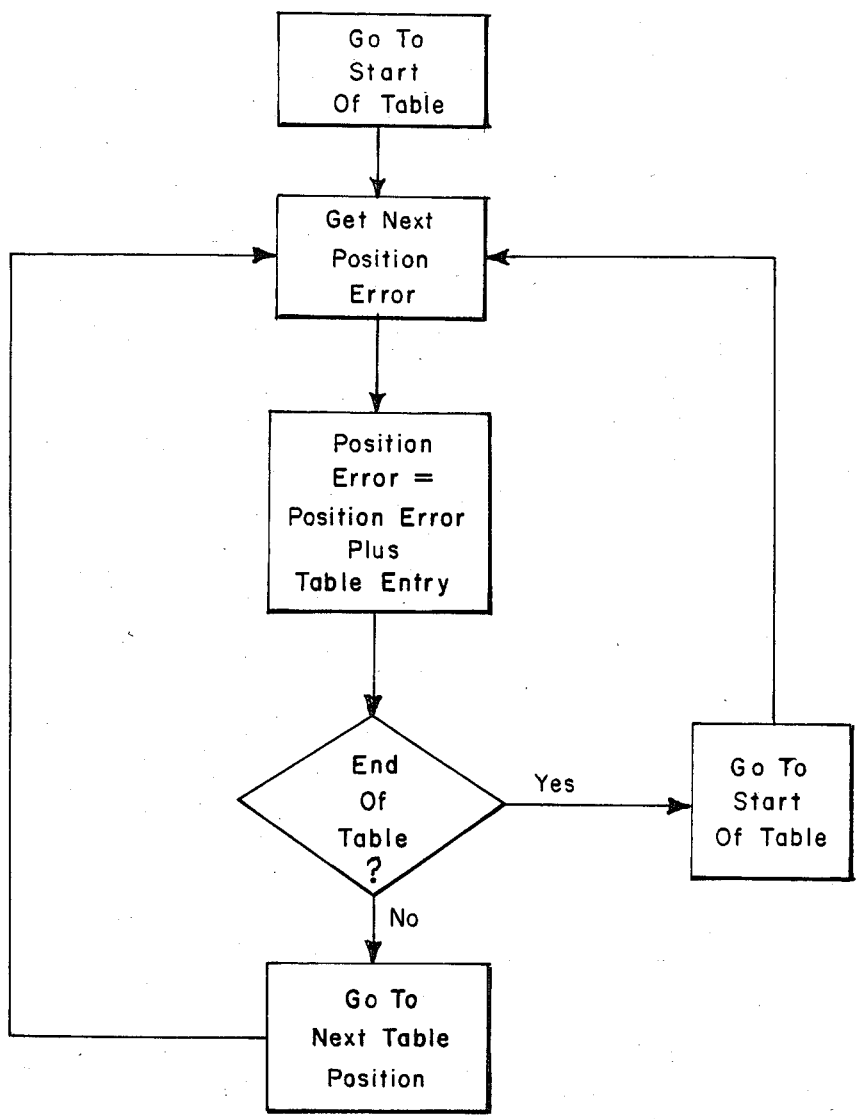
FIG. 6 is a flowchart showing the manner in which the system depicted in FIG. 3 eliminates deadbands in the system.

Summer 106 receives the position subcommands along 194 and the actual position signals along line 188 and subtracts the actual position signals from the subcommands. Accordingly, summer 106 transmits along line 186 a position error signal. Each position error signal represents the variation during each cycle of the actual position from the commanded position. Error signal modifier 114 receives the position error signals along line 186 and performs the following function on those signals:

$$G(S) + 1/K_A, \qquad (1)$$

to achieve a modified position error signal, or velocity command. The fraction term of equation (1) provides the desired acceleration control for system 100. G(S) is a nonlinear function whose purpose is to remove the effect of the lost accuracy resulting from the integer divide represented by the fractional term of equation (1). Without the term G(S), the velocity command would always be a rounded down result, resulting in a critical loss of accuracy in the performance of system 100. If n represents the position error signal to be divided by $K_A$, G(S) causes the value of each position error signal operated upon by module 114 to alternate between n and n+1, to account for the lost remainder in the integer divide. FIG. 6 illustrates, in flowchart form, the method used to alter the values of some of the position error signals prior to the division by $K_A$. In the preferred embodiment, $K_A$ is equal to 16. Accordingly, the table accessed by the microprocessor following the flowchart of FIG. 6 consists of the following sequential entries: 0, 3, 6, 9, 12, 15, 2, 5, 8, 11, 14, 1, 4, 7, 10 and 13. Generally, the microprocessor, in following the flowchart, performs the following steps:

(1) Go to start of table
(2) Get next position error
(3) Set position error to position error plus table entry
(4) Set velocity command to position error divided by $K_A$
(5) If at end of table, go to start of table and go to step (2)
(6) Go to next table position
(7) Go to step (2)

Figure 7:
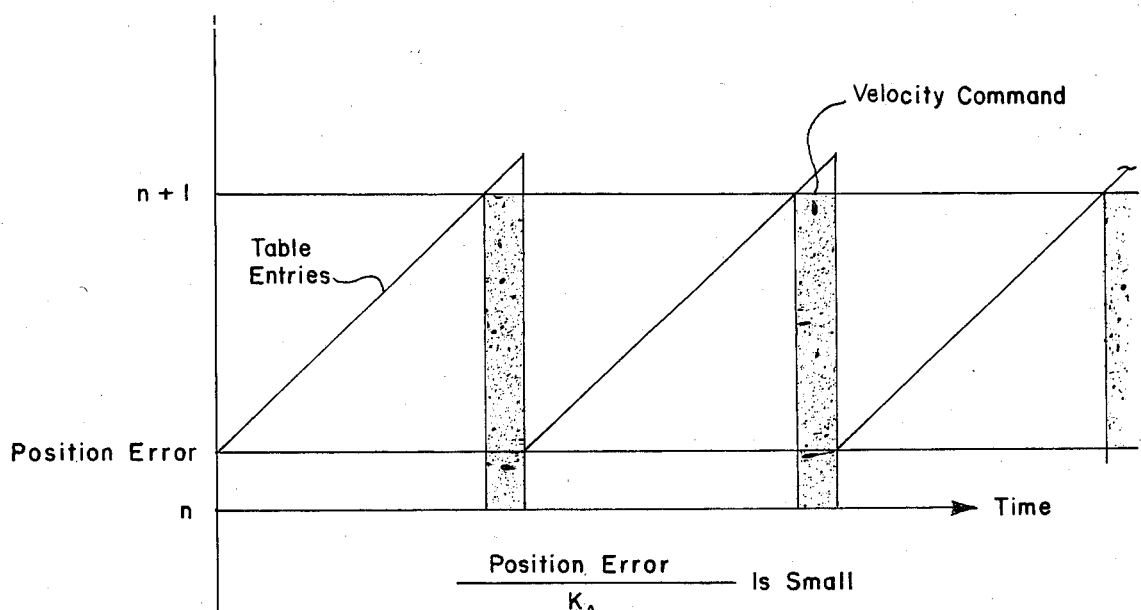
FIG. 7 is a graphical representation of the results of performance of the procedure depicted in FIG. 6.
Figure 7:
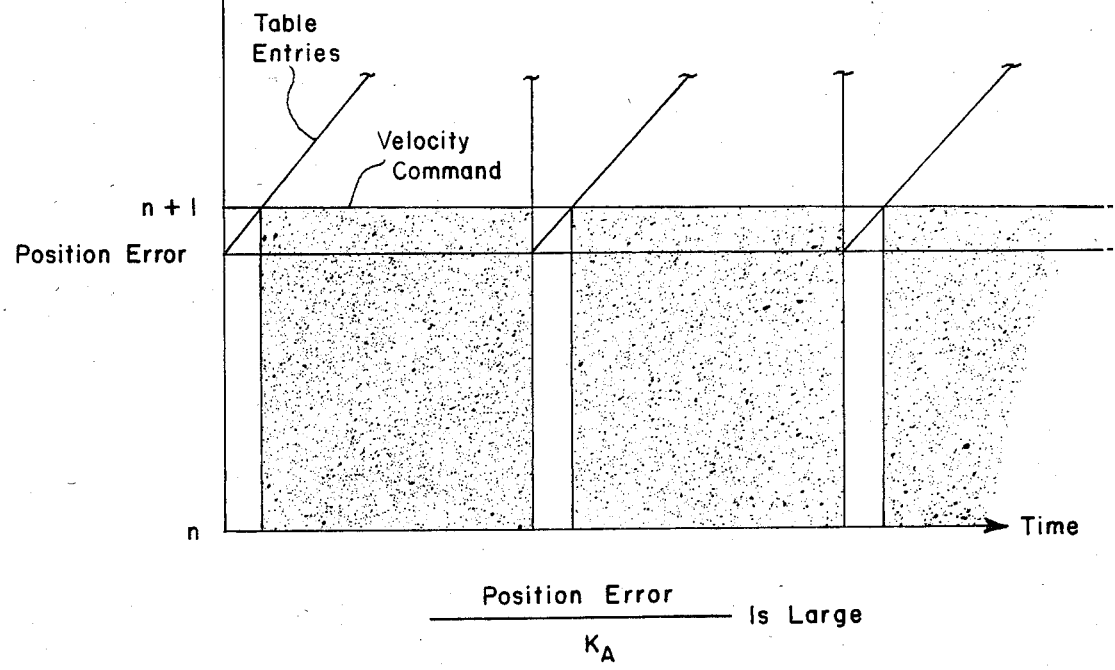

FIG. 7 illustrates graphically the results of the performance of the method depicted in FIG. 6. If $K_A$ is set to a value other than 16, the table entries must be changed. Generally, the first table entry must be zero and the second table entry must be a prime number. Each table entry consists of the immediately preceding table entry plus the prime number. The number of the table entries equals $K_A$.

Module 114 transmits the modified position error signal, or velocity command, along line 184 to a summer 116. Summer 116 receives a position difference, or actual velocity, signal created by module 110 along line 182. Summer 116 transmits along line 180 a velocity error signal representing the difference between the modified position error signal and the position difference signal. Module 118 operates on the velocity error signal received along 180 to provide compensating gain, as in conventional analog control systems. The modified velocity error signal generated by module 118 along line 178 is received by a power amplifier and D/A converter 120. Module 120 converts the modified velocity error signal to a signal suitable for energizing motor 104 and causing its movable member to achieve desired motion. Module 118 can include any suitable power amplifier and can be of the pulse width modulator type.

It is convenient for proper functioning of system 100 for one position increment to be equal to 1/16,384 revolutions of the movable member of motor 104. Accordingly, there are 16,384 position increments, or internal units, in one revolution of the rotating member. In many applications, it is not convenient, or necessary, for the user of system 100 to specify motion parameters in terms of internal units. Accordingly, the user specifies commands in external units, which allow representation of fewer positions than internal units. The command generator converts from external units to internal units. The procedure followed by command generator 104 results in no loss of accuracy of position. The command generator uses a conversion table to convert each incremental position signal to internal units. Command generator 104 converts incremental position signals, rather than the position subcommands, because the possible variation in the incremental position signals is no greater than 100, whereas the variation in the position subcommands can be so great as to require a conversion table of an impractical size.

Figure 8:
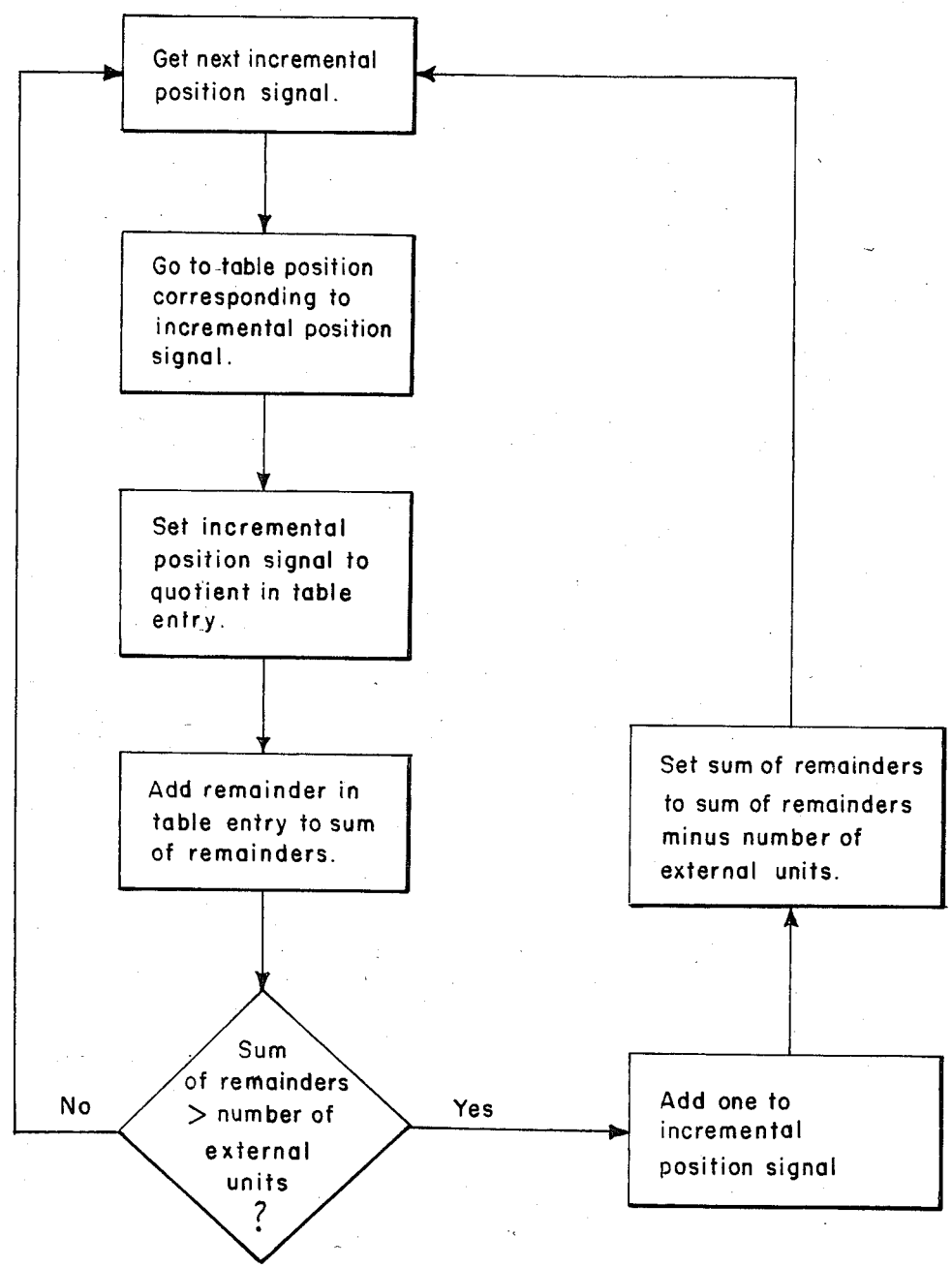
FIG. 8 is a flow chart showing the manner in which the system shown in FIG. 3 converts incremental position signals in external units to position commands in internal units.

The conversion table has 101 entries, ranging from 0 to 100, where each table entry consists of two entries. The first entry is the integer resulting from an integer-division of 16,384 by the number of available external units. The second entry is the remainder resulting from that integer divide. During each cycle, the command generator uses the supplied external incremental position signal to access the conversion table. The command generator 104 uses as the internal incremental position signal the integer it finds in that location. However, it also adds to a running sum the remainder found in that position in the conversion table. If the running sum is greater than the number of external units available to the user, it adds one to the integer to obtain the internal incremental position signal. A flowchart depicting the procedure followed by command generator 104 to compute an internal position command from an external incremental position signal is illustrated in FIG. 8. In particular, command generator 104 follows the following steps:

(1) Determine from the conversion table the quotient and remainder corresponding to the external incremental position signal
(2) Set the value of the internal incremental position signal, that corresponds to the external incremental position signal, to the value of the determined quotient
(3) Add the value of the determined remainder to the running total of remainders
(4) If the running total of remainders is greater than the number of positions in the set of external user increments, add one to the value of the internal incremental position signal established in step (2) and subtract from the running total of remainders the number equal to the number of positions in the set of external user units.

What is claimed is:

1. A sampled data system for controlling the motion of an object, said system including means for generating a command representative of the motion desired of said object, comprising;
 means for processing said command by generating at least one series of subcommands, each subcommand representing a segment of said desired motion over a time period;
 means for detecting at least one motion characteristic of the actual motion of said object and providing a signal representative thereof;
 means for comparing at least one of said subcommands to at least one of said signals representative of said actual motion characteristic of the object and generating at least one error signal representative of the variation of a characteristic of the actual motion of the object from the corresponding characteristic of the motion represented by said subcommands;
 means for so modifying said error signal that said system exhibits a set of desired performance characteristics, said modifying means including means for reducing the effect that said error signals have on a motion characteristic of the motion of the object by performing on said error signals a function that includes a division of said error signals by a predetermined number accomplished in integer fashion, said reducing means so increasing the values of some of said error signals that the average value of said divided error signals approximates the value each said divided error signal would have had if said division had been performed in floating point fashion; and
 means for converting a said modified error signal to a signal suitable for application to a prime mover which causes said object to exhibit said desired motion.

2. The sampled data system recited in claim 1 wherein the motion represented cumulatively by a group of said subcommands generated over a time interval is the desired motion of the object over said time interval.

3. The sampled data system recited in claim 1 further including means for permitting a user of said sampled data system to formulate motion commands in external units which differ from the internal units used by said system to process said motion commands, and converting said external motion commands to internal motion subcommands.

4. The sampled data system recited in claim 1 wherein each said subcommand has a value that is related to the desired position of the object.

5. The sampled data system recited in claim 4 wherein the position of the object and the velocity at which the object moves is controlled by setting said values of said subcommands.

6. The sampled data system recited in claim 5 wherein said processing means creates a series of incremental position signals, the value of each said incremental position signal representing the number of positions through which the object is to move, and wherein said processing means converts a said series of incremental position signals to said series of subcommands.

7. The sampled data system recited in claim 6 wherein:
 said processing means generates each said series of subcommands within a time interval of a predetermined length, all said time intervals being the same in length; and
 the total number of positions represented by the said incremental position signals from which a said series of subcommands is created divided by the length of said time interval is equal to the desired velocity of the object over said time interval.

8. The sampled data system recited in claim 7 wherein:
 each said incremental position signal and each said subcommand is represented by an integer; and
 the values of said incremental position signal integers over a said interval are so determined that the sum of said incremental position signal integers divided by the length of said time interval is substantially equal to the desired velocity of said object during said time interval.

9. The sampled data system recited in claim 8 wherein the variation between the largest integer of each said series and the smallest integer of each said series is no larger than one.

10. The sampled data system recited in claim 9 wherein the single motion characteristic detected by said detecting means is the position of the object.

11. The sampled data system recited in claim 10 wherein said detecting means is a sensor, the output of which is a series of actual position signals, each of which is related to the actual position of the object at the time the position signal is generated.

12. The sampled data system recited in claim 11 wherein said detecting means so processes said series of actual position signals that said comparing means can compare said series of actual position signal to said series of subcommands to produce a series of error signals related to the difference therebetween.

13. The sampled data system recited in claim 12 wherein said modifying means modifies said series of position error signals.

14. The sampled data system recited in claim 13 wherein:
 said detecting means generates from said series of actual position signals a series of signals related to the actual velocity of the object; and
 said comparing means compares said series of modified postion error signals to said series of actual velocity signals to produce a series of error signals related to the difference therebetween.

15. The sampled data system recited in claim 14 wherein:

said modifying means further modifies said series of velocity error signals; and said converting means converts said modified velocity error signals to said signals suitable for application to the prime mover.

16. The sampled data system recited in claim 13 wherein said reducing means reduces the effect that each said position error signal has on the magnitude of the velocity at which the object is moved to a desired position, to decrease the acceleration the object experiences as it moves toward said desired position.

17. The sampled data system recited in claim 16 wherein said reducing means divides each said position error signal by a predetermined number.

18. The sampled data system recited in claim 17 wherein:

said division is performed in integer fashion;

said reducing means so increases the values of some of said position error signals that the average value of said divided position error signals approximates the value each said divided position error signal would have had if the division had been performed in floating point fashion.

19. The sampled data system recited in claim 12 wherein:

the value of each said actual position signal indicates at which position of a set of positions the object is located;

said sampled data system is capable of causing the object to assume any position in said set of positions; and said sampled data system includes means for permitting a user of said sampled data system to cause the object to assume one position of a subset of positions, said subset including less than all said positions in said set of positions, without reducing the precision of said system.

20. The sampled data system recited in claim 19 wherein said processing means receives commands in external units which correspond to said subset of positions, and generates said subcommands in internal units which correspond to said set of positions.

21. The sampled data system recited in claim 20 wherein said processing means generates said series of incremental position signals in external units and converts said series of external incremental position signals to said series of subcommands in internal units.

* * * * *

UNITED STATES PATENT AND TRADEMARK OFFICE
CERTIFICATE OF CORRECTION

PATENT NO. : 4,578,763

DATED : March 25, 1986

INVENTOR(S) : Donald H. Jones, Spencer W. Allen and Philip R. Chimes

It is certified that error appears in the above—identified patent and that said Letters Patent is hereby corrected as shown below:

Col. 2, line 62, delete "of" and substitute therefor --to--.

Signed and Sealed this

First Day of July 1986

[SEAL]

Attest:

DONALD J. QUIGG

Attesting Officer

Commissioner of Patents and Trademarks